United States Patent [19]

Yamamoto

[11] 4,308,534

[45] Dec. 29, 1981

[54] MULTIPLEXING LIQUID CRYSTAL DISPLAY DEVICE HAVING DIFFERENT DISPLAY FORMATS

[75] Inventor: Tomoo Yamamoto, Tokyo, Japan

[73] Assignee: Kabushiki Kaisha Daini Seikosha, Tokyo, Japan

[21] Appl. No.: 95,562

[22] Filed: Nov. 19, 1979

[30] Foreign Application Priority Data

Dec. 8, 1978 [JP] Japan .................................. 53-152488

[51] Int. Cl.³ .............................................. G06F 3/14
[52] U.S. Cl. ..................................... 340/784; 340/792; 340/752; 350/333
[58] Field of Search ............... 340/784, 792, 789, 752, 340/756, 765; 350/333, 336, 332, 331, 330

[56] References Cited

U.S. PATENT DOCUMENTS

| | | | |
|---|---|---|---|
| 3,898,642 | 8/1975 | Dorey et al. | 340/784 |
| 4,150,363 | 4/1979 | Criscimagna et al. | 340/752 |
| 4,191,955 | 3/1980 | Robert | 340/784 |

Primary Examiner—Marshall M. Curtis
Attorney, Agent, or Firm—Robert E. Burns; Emmanuel J. Lobato; Bruce L. Adams

[57] ABSTRACT

A multiplexing liquid crystal display device having a plurality of scanned display electrodes and a plurality of signal display electrodes crossing each other sandwiching a liquid crystal layer therebetween. The scanned display electrodes include at least one electrode which is not utilized for displaying a figure while the figure is displayed by the rest of the scanned display electrodes and the signal display electrodes. A nonselect display voltage is continuously applied to the electrode not utilized for displaying the figure and a scanned select display voltage is applied to the rest of the scanned display electrodes. The electrode not utilized for displaying the figure may be switched among the different scanned display electrode for changing the format of the display.

11 Claims, 8 Drawing Figures

F I G. 6
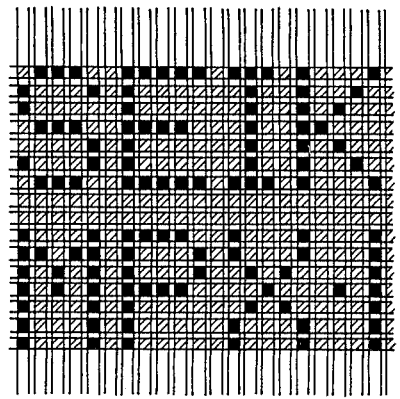
F I G. 7
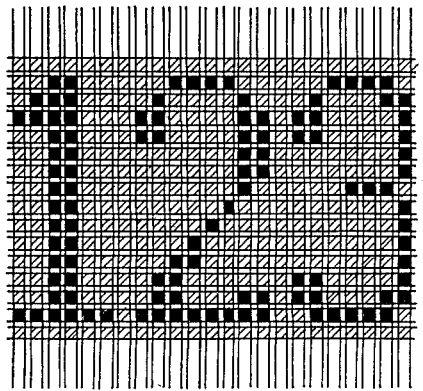

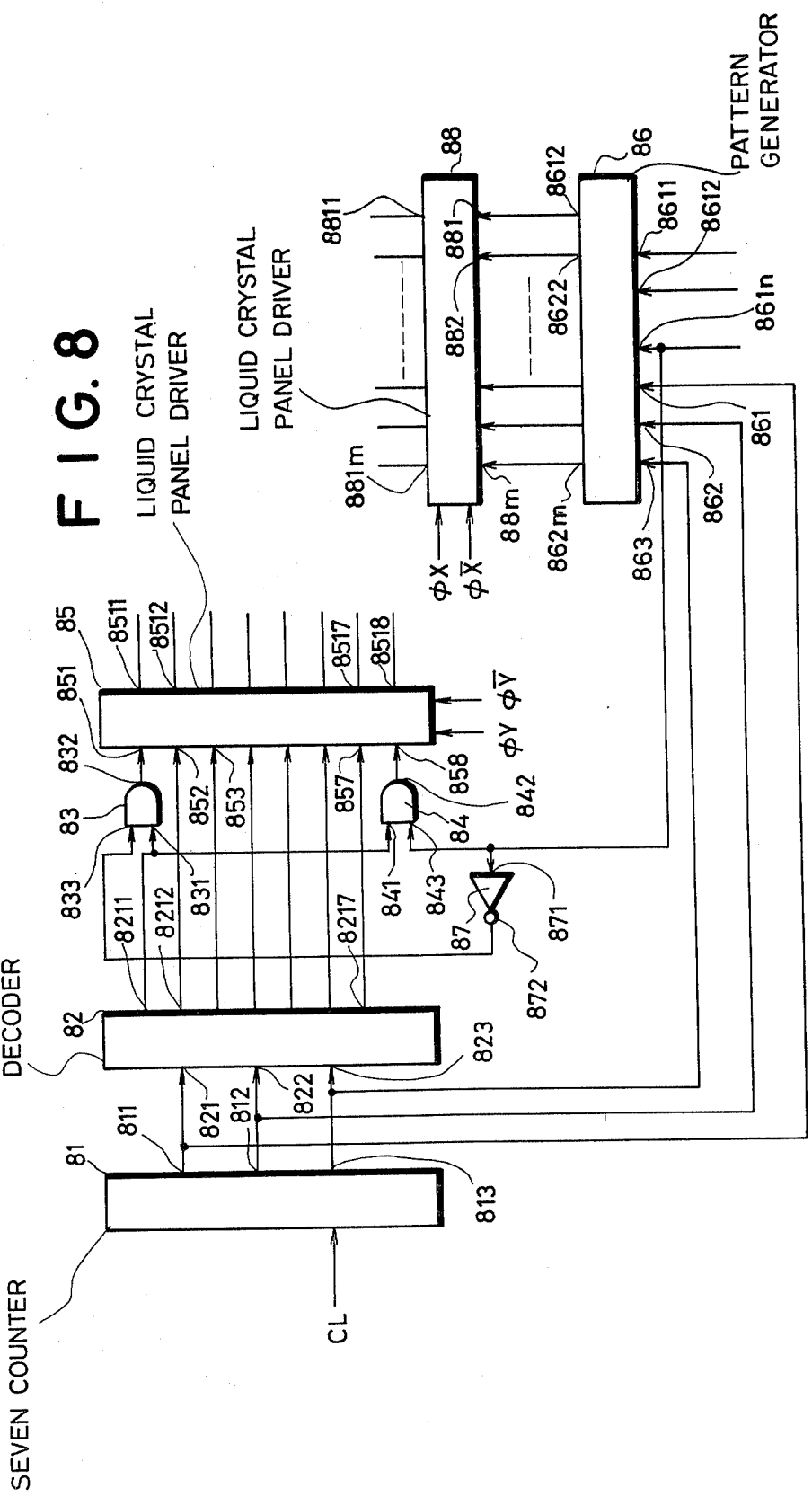

MULTIPLEXING LIQUID CRYSTAL DISPLAY DEVICE HAVING DIFFERENT DISPLAY FORMATS

BACKGROUND OF THE INVENTION

The present invention relates to a multiplexing liquid crystal display device.

Liquid crystal display devices have been put to popular use as display devices for electronic instruments. Information to be displayed on a conventional liquid crystal display device has been mostly in the form of comparatively simple figures consisting of a small number of picture elements. The conventional liquid crystal display device displays no more than the comparatively simple figures because (1) it is difficult technically to make the display electrodes very complex and (2) it is difficult to have an electrical connection between a liquid crystal display panel and a driving circuit for the liquid crystal panel if the number of terminal electrodes is large. As a means to display complicated figures, a multiplexing driving method, which overcomes the above mentioned disadvantages, has been invented for use in conventional liquid crystal display devices. However, several difficult problems have arisen in applying the multiplexing driving method to the liquid crystal display and these problems have not been solved yet.

One of the problems is that the deterioration of the liquid crystal display element is accelerated if the elements are not driven by AC voltage.

If select display voltages and nonselect display voltage applied to scanned display electrodes of the liquid crystal display panel are respectively $\phi_Y$ and $\overline{\phi_Y}$, and if the waveforms of the select display voltages and the nonselect display voltages applied to signal display electrodes of the liquid crystal display panel are respectively $\phi_X$ and $\overline{\phi_X}$, the states of the voltage waveforms of the liquid crystal display panel are represented by the following equations:

$$\phi_1 = \phi_Y - \phi_X \quad \text{(a)}$$

$$\phi_2 = \phi_Y - \overline{\phi_X} \quad \text{(b)}$$

$$\phi_3 = \overline{\phi_Y} - \phi_X \quad \text{(c)}$$

$$\phi_4 = \overline{\phi_Y} - \overline{\phi_X} \quad \text{(d)}$$

If the total number of the scanned display electrodes is M and the number of the select display picture elements and the nonselect display picture elements of some signal display element are respectively $m_1$ and $m_2$, $M = m_1 + m_2$.

Accordingly the voltages having waveforms $\phi_1$, $\phi_3$ and $\phi_4$ are applied to the select display picture elements respectively once, $(m_1 - 1)$ times and $(M - m_1)$ times during one frame interval. While the voltages having waveforms $\phi_2$, $\phi_3$ and $\phi_4$ are applied to the nonselect display picture elements respectively once, $m_1$ times and $(M - m_1 - 1)$ times during one frame interval. Accordingly some AC voltage is also applied to the nonselect display picture elements generally. And if a threshold voltage of the liquid crystal display panel is lower than the root mean square voltage (referred to as the rms voltage hereafter) of the voltage waveform applied to the nonselect display picture elements, the picture elements that are intended to be the nonselect picture elements are displayed on the liquid crystal display panel and the so called cross talk is present.

Generally, it is necessary to prevent dispersion of the cross talk density, if cross talk should be present, by fixing the rms value of the voltage waveform applied to the nonselect display picture elements under any conditions for display. In order to prevent the dispersion of the cross-talk, $|\phi_3|$, the rms value of $\phi_3$, and $|\phi_4|$, the rms value of $\phi_4$, must be the same. Accordingly, as for the select display picture elements, $\phi_1$ is applied once in M times and the voltage equivalent to $\phi_3$ is applied the remaining (M-1) times during one frame interval. On the other hand, as for the nonselect picture elements, $\phi_2$ is applied once in M times and the voltage equivalent to $\phi_3$ is applied the remaining (M-1) times during the same one flame interval. Therefore, the voltage equivalent to $\phi_3$ is applied to both the select display picture elements and the nonselect display picture elements for (M-1) times in M times. And the select display picture elements and the nonselect display picture elements are distinguished by the remaining one voltage $\phi_1$ or $\phi_2$. Namely, the larger M becomes, the smaller the difference of the rms value between the voltage applied to the select display picture elements and the voltage applied to the nonselect display picture elements becomes. Consequently, it is desirable that the total number of scanned display electrodes M is at a minimum.

However, if the number of the scanned display electrodes is reduced, the layout of the display patterns to be displayed on it becomes difficult to realize a liquid crystal plane is limited and the variable display.

As a means of realizing a variable display with a small number of scanned display electrodes, a multiple matrix liquid crystal panel and a multiplexing liquid crystal display panel provided with electrodes shown in FIG. 1 have been proposed.

The multiplexing liquid crystal display panel in FIG. 1, conventionally well known, comprises a plurality of U-shaped scanned display electrodes 11 and pairs of signal display electrodes 12, i.e., the upper and lower portions 12a and 12b. By driving the signal display electrodes 12a and 12b separately, the multiplexing liquid crystal display panel can be operated to display information as if the number of the scanned display electrodes is doubled. On driving the multiplexing liquid crystal display panel, the scanned select display voltage is applied to the scanned display electrodes. In case where one character or letter is comprised of picture elements 5 columns and 7 rows (referred to as 5×7 characters hereafter) and is displayed on the multiplexing liquid crystal display panel shown in FIG. 1 (referred to as the "U-shaped" electrode panel hereafter), an interval between electrode portions 21a and 21b of a "U-shaped" scanned display electrode 21 at an inner portion is wide enough so as to be distinguished from an interval between the electrode portion 21a and the neighboring electrode, e.g., an interval between the electrode portions 21a and 22a. By leaving intervals between the characters displayed on the upper and lower portions sufficiently large, the display of the different characters is easily recognized. In this arrangement of the scanned display electrodes, a very effective display is possible with regard to the 5×7 characters displayed on the upper and lower portions of the display panel as shown in the display condition in FIG. 3.

However, the scanned display electrodes arrangement is disadvantageous with regard to display of other characters and drawings formats. For instance, in case a letter composed on the picture elements of 7 columns and 9 rows is displayed using the "U-shaped" electrode panel, the characters are divided in two and the two parts of the characters are displayed separately on the upper and lower portions of the "U-shaped" electrode panel, and the interval between the electrode portions 21a and 21b exists with the characters divided as shown by an example of such a display condition shown in FIG. 4, and as a result the display is unsightly.

On the other hand, as for the display condition in which cross-talk is present, the picture elements to be essentially in the nonselect display condition are displayed slightly, as indicated by oblique lines in FIGS. 3 and 4. In this display condition a wide belt appears as an interval through the cross talk on the panel, and as a result the display is exceedingly unsightly.

SUMMARY OF THE INVENTION

It is an object of the present invention to provide a multiplexing liquid crystal display device which realizes a variable display by a comparatively small number of scanned select display voltages and which provides sightly displays even if cross-talk is present.

BRIEF DESCRIPTION OF THE DRAWINGS

FIGS. 6 and 7 are plan views showing the embodiments of display according to the driving method of the present invention, FIG. 8 is a circuit diagram showing the embodiment of the driving circuit according to the present invention.

DETAILED DESCRIPTION OF THE INVENTION

Hereafter the embodiment of the present invention, applied to the "U-shaped" electrode panel display having eight scanned display electrodes, will be described.

Figure 1:
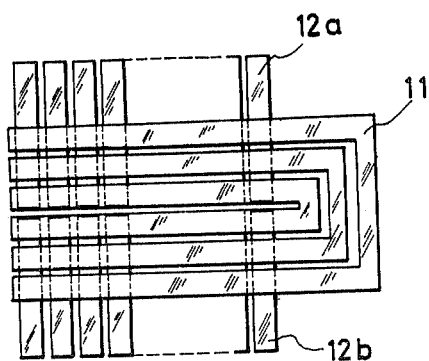
FIGS. 1, 2 and 5 are plan views showing the typical electrode construction of the "U-shaped" electrode panels.
Figure 2:
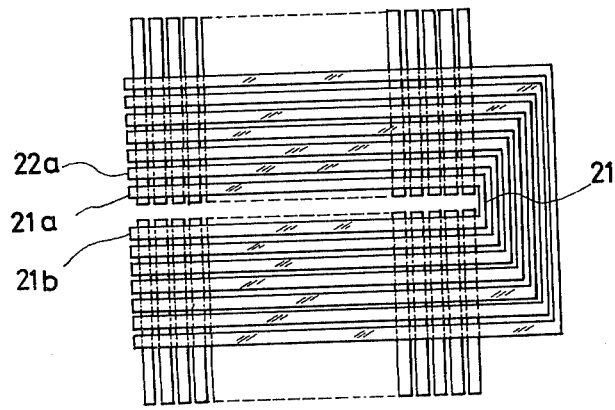
Figure 4:
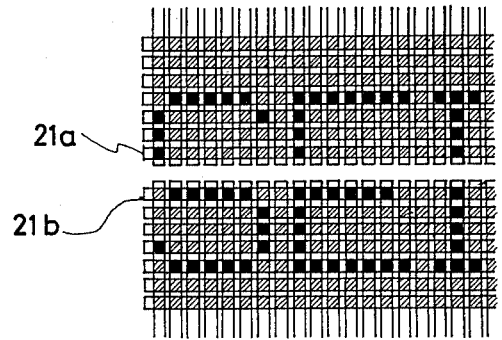
Figure 5:
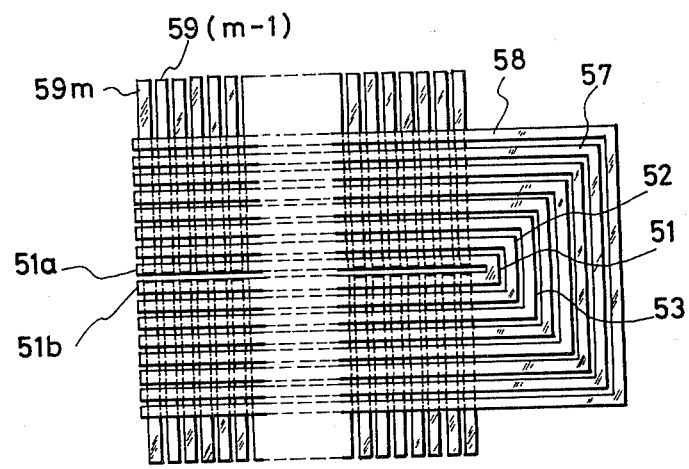

The "U-shaped" electrode panel according to the present embodiment has an interval between electrode portions 51a 51b of an innermost "U-shaped" scanned display electrode 51 equal to intervals between the other neighboring electrodes as shown in FIG. 5. On this point the "U-shaped" electrode panel in this embodiment is different from the multiplexing liquid crystal display panel shown in FIGS. 2, 3 and 4. In case the 5×7 characters are displayed on the upper and lower portions of the "U-shaped" electrode panels, the nonselect display voltage waveform $\overline{\phi y}$ is constantly applied to the innermost "U-shaped" scanned display electrode 51, while the scanned select display voltage is applied to the remaining seven "U-shaped" scanned display electrodes 52, 53, . . . , 58. By this multiplexing driving, the 5×7 characters are displayed on the upper and lower portions of the "U-shaped" electrode panel as shown in FIG. 6.

On the other hand, display figures extending over the upper and lower portions of the "U-shaped" electrode panel can be displayed as shown in FIG. 7 if the nonselect display voltage waveform $\phi y$ is constantly applied to an outermost "U-shaped" scanned display electrode 58 and the scanned select display voltage is applied to the remaining seven "U-shaped" scanned display electrodes 51, 52, . . . , 57 and actuated by multiplexing driving.

Figure 3:
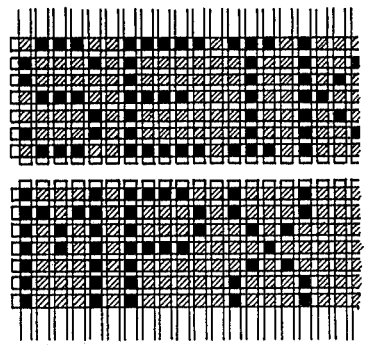
FIGS. 3 and 4 are plan views showing examples of display according to the conventional driving method.

Furthermore, if there is any cross talk it is present all over the display picture uniformly as shown by oblique lines in FIGS. 6 and 7, so that the display is not so unsightly as the displays shown in FIGS. 3 and 4. Moreover, an arbitrary number of the same "U-shaped" scanned display electrodes may be arranged on the outer portion of the "U-shaped" scanned display electrode 58 shown in FIG. 5 according to the dimension of the display picture that is desired.

Although the present invention has been illustrated in conjunction with the "U-shaped" electrode panel showing the effect of the present invention in comparison with prior art techniques using a "U-shaped" electrode panel, it is to be noted that the present invention may be applied to a liquid crystal display panel comprising a plurality of scanned display electrodes and a plurality of signal display electrodes that cross each other sandwiching a liquid crystal layer therebetween, and the effect of the liquid crystal display panel is apparent by the above mentioned description.

It is very easy to realize the above mentioned driving method for a multiplexing liquid crystal display device to apply a nonselect display voltage to one or a plurality of arbitrary chosen display electrodes out of a plurality of scanned display electrodes and to apply a scanned select display voltage to the remaining display electrodes according to the layout of the display patterns.

FIG. 8 shows an embodiment of a driving circuit to realize the display shown in FIGS. 6 and 7 by the display electrode construction typically shown in FIG. 5.

In FIG. 8 a clock signal CL is fed to a hepta-counter 81. Output terminals 811, 812 and 813 of the hepta-counter are connected to input terminals 821, 822 and 823 of a decoder 82. The decoder 82 responds to the input signals from the counter 81 to switch one of seven output terminals 8211, 8212, . . . , 8217 to an active state and the remaining six output terminals to an inactive state according to the hepta-codes of the input terminals 821, 822 and 823. One output terminal 8211 of the decoder 82 is connected to input terminals 831 and 841 of two AND circuits 83 and 84. Output terminals 832 and 842 of the AND circuits 83 and 84 are respectively connected to control input terminals 851 and 858 of a liquid crystal panel driver 85. The output terminals 8212, . . . , 8217 of the decoder 82, but not the output terminal 8211, are respectively connected to control input terminals 852, . . . , 857 directly. Apart from the control input terminals, the select display voltage waveform $\phi y$ and nonselect display voltage waveform $\overline{\phi y}$ are fed to the liquid crystal panel driver 85. The liquid crystal panel driver 85 is provided with output terminals 8511, . . . , 8518 producing the select display voltage waveform $\phi y$ or nonselect display voltage waveform $\overline{\phi y}$ respectively according to the active state or inactive state of each of the input terminals 851, . . . , 858. On the other hand, the output terminals 811, 812 and 813 of the hepta-counter 81 are connected respectively to assigned input terminals 861, 862 and 863 of a pattern generator 86 for the scanned display electrodes. The pattern generator 86 is provided with input terminals 8611, 8612, . . . , 861n which receive signals that determine the patterns to be displayed, in conjunction with signals applied to the input terminals of the scanned display electrodes. Particularly, the input terminal 861n receives a signal to determine whether a pattern is displayed on either the upper and lower portions of the display picture of the "U-shaped" electrode panel or displayed extending over both the upper and lower portions of the display picture thereof. And the signal fed to the input terminal 861n is applied to an input terminal 843 of the AND circuit 84 and an input terminal 871 of a NOT circuit 87. An output terminal 872 of the NOT circuit 87 is connected to an input terminal 833 of the AND circuit 83. Output terminals 8621, . . . , 862m of the pattern generator 86 produce the select and nonselect signals of the signal display electrodes determined by the signals applied to the input terminals 8611, . . . , 861n. The output terminals 8621, . . . , 862m of the pattern generator 86 are connected to control input terminals 881, . . . , 88m of a liquid crystal panel driver 88. Apart from these control inputs, the select display voltage waveform $\phi_X$ and the nonselect display voltage waveform $\overline{\phi_X}$ are fed to the liquid crystal panel driver 88. The liquid crystal panel driver 88 is provided with output terminals 8811, . . . , 881m producing the select display voltage waveform $\phi_X$ or nonselect display voltage waveform $\overline{\phi_X}$, respectively, according to the active state or inactive state of each of the input terminals 881, . . . , 88m.

The output terminals 8811, . . . , 881m of the liquid crystal panel driver 88 are connected to each of the signal display electrodes 591, . . . , 59m of the "U-shaped" electrode panels shown typically in FIG. 5. While the output terminals 8511, 8512, . . . , 8518 of the liquid crystal panel driver 85 are connected respectively to the "U-shaped" scanned display electrodes 51, 52, . . . , 58 in FIG. 5. Thus, by connecting the driving circuit to the "U-shaped" electrode panel, the output terminal 842 of the AND circuit 84 actuates in the same way as the output terminal 8211 of the decoder 82 when the active signal is applied to the input terminal 861n of the pattern generator 86, while the output terminal 832 produces an inactive signal since the inactive signal is applied to the input terminal 833 of the AND circuit 83 from the output terminal 872 of the NOT circuit 87. Therefore, the nonselect display voltage waveform $\phi_Y$ is produced from the output terminal 8511 of the liquid crystal panel driver 85 regardless of the other output signals during scanning, while the select display voltage waveform $\phi_Y$ is produced from the remaining output terminals 8512, . . . , 8518 once every seven clocks of the clock signal CL fed to the hepta-counter 81. Thus the scanned select display voltage waveform is produced from the output terminals of the liquid crystal panel driver 85. Accordingly, the "U-shaped" scanned display electrodes 52, . . . , 58 shown in FIG. 5 are scanned and the display shown in FIG. 6 is realized.

On the other hand, when the inactive signal is applied to the input terminal 861n of the pattern generator 86, the output terminal 842 of the gate circuit 84 becomes inactive, while the output terminal 832 of the gate circuit 83 becomes active in the same way as the output terminal 8211 of the decoder 82. Therefore the scanned select display voltage is produced from the output terminals 8511, . . . , 8517, while the nonselect display voltage waveform $\phi_Y$ is produced from the output terminal 8518 of the liquid crystal panel driver 85. Thus the "U-shaped" scanned display electrodes 51, . . . , 57 shown in FIG. 5 are scanned and the display as shown in FIG. 7 is realized.

As illustrated above, according to the present invention, the variable display is realized by a comparatively small number of scanned select display voltages, and the multiplexing liquid crystal display having constant cross-talk is realized.

What is claimed is:

1. A multiplexing liquid crystal display device, comprising: a plurality of scanned display electrodes; a plurality of signal display electrodes crossing said plurality of scanned display electrodes; a liquid crystal layer sandwiched between said scanned display electrodes and said signal display electrodes; said scanned display electrodes include at least one electrode which is not utilized for displaying a figure while said figure is displayed by the rest of said scanned display electrodes and said signal display electrodes; means for applying continuously a nonselect display voltage to the scanned display electrode not to be utilized for displaying said figure; and means for applying a scanned select display voltage to the rest of said scanned display electrodes.

2. A multiplexing liquid crystal display device as claimed in claim 1, further comprising: switching means for switching the nonselect display voltage applied to said electrode that is not to be utilized for displaying a figure to the different scanned display electrodes for changing the layout of display pattern.

3. A multiplexing liquid crystal display device as claimed in claim 1 or 2, wherein each of the scanned display electrodes has a U-shape.

4. A multiplexing liquid crystal display device as claimed in claim 3, wherein said electrode that is not to be utilized for displaying a figure is the outermost electrode of the scanned display electrodes.

5. A multiplexing liquid crystal display device as claimed in claim 3, wherein said electrode that is not to be utilized for displaying a figure is the innermost electrode of the scanned displayed electrodes.

6. A multiplexing liquid crystal display device as claimed in claim 3, wherein the U-shaped scanned display electrodes are arranged to make two-line display possible while the innermost electrode of the scanned display electrodes is not utilized for display and to make one-line display possible while the outermost is not utilized for display.

7. In a multiplexing liquid crystal display device:
a plurality of scanned display electrodes arranged at regular intervals;
a plurality of signal display electrodes arranged at regular intervals and crossing said plurality of scanned display electrodes;
liquid crystal material disposed between said plurality of scanned display electrodes and said plurality of signal display electrodes, regions of said liquid crystal material in the vicinity of crossings of respective ones of said scanned display electrodes and respective ones of said signal display electrodes exhibiting a substantial change in light transmissive properties in response to an electric bias signal greater than a certain threshold value applied thereto, wherein a region of the liquid crystal material exhibiting the substantial change in light transmissive properties defines a picture element for visually displaying information;
scanned electrode biasing means for continuously electrically biasing a selected one of said scanned display electrodes sufficiently below the threshold value for maintaining said selected scanned display electrode in a condition ineffective to change substantially the light transmissive properties of the liquid crystal material in the region of the selected scanned display electrode;

switching means cooperative with said scanned electrode biasing means for switching the selected scanned display electrode that is continuously biased by said scanned electrode biasing means;

scanning means for successively and repeatedly electrically biasing individual ones of said scanned display electrodes except said selected scanned display electrode to a value sufficient to change substantially the light transmissive properties of liquid crystal material in every region where a biased signal display electrode crosses a scanned display electrode biased by said scanning means; and signal display electrode biasing means for electrically biasing respective ones of said signal display electrodes to exceed the bias threshold value of regions of the liquid crystal material in the vicinity of crossings of the scanned display electrodes biased by said scanned electrode biasing means and the signal display electrodes biased by said signal electrode biasing means in order to visually display information.

8. In a multiplexing liquid crystal display device according to claim 7: said scanned display electrodes each comprising a generally U-shaped element having a pair of straight parallel legs; said scanned display electrodes each having a different distance between its respective pair of legs; and said plurality of scanned display electrodes being arranged with the one of the scanned display electrodes having the smallest distance between its respective pair of legs in the center of said plurality of scanned display electrodes and with all of the display scanned electrodes positioned with their respective legs equally spaced, and with said display scanned electrodes arranged with the legs of those display scanned electrodes having a larger distance between their respective legs disposed on opposite sides of those display scanned electrodes having smaller distances between their respective legs.

9. In a multiplexing liquid crystal display device according to claim 7: said signal display electrodes each comprising a respective pair of electrode portions arranged opposite each other and electrically isolated from each other to permit a pair of electrode portions comprising a particular signal display electrode to be independently biased.

10. In a multiplexed liquid crystal display device:

a plurality of generally U-shaped electrodes, each of said U-shaped electrodes having a pair of straight parallel legs, said plurality of generally U-shaped electrodes arranged with each successive U-shaped electrode positioned between the legs of a next succeeding U-shaped electrode, and said plurality of generally U-shaped electrodes positioned and dimensioned so that their respective legs lie parallel and adjacent legs of said generally U-shaped electrodes are equally spaced;

a plurality of pairs of generally straight electrode sections aligned along an imaginary line and having respective ends facing each other and spaced apart to permit the electrode sections of each pair to be individually biased, and each of said pairs of electrode sections being positioned to cross generally perpendicular to said legs of said U-shaped electrodes with one electrode section of each pair crossing the legs of said U-shaped electrodes lieing on one side of the center of said plurality of U-shaped electrodes and with the second electrode section of each pair crossing the legs of said U-shaped electrodes lieing on the second side of the center of said plurality of U-shaped electrodes;

liquid crystal material disposed between said plurality of U-shaped electrodes and said plurality of pairs of electrode sections, regions of said liquid crystal material in the vicinity of crossings of respective ones of said U-shaped electrodes and respective ones of said electrode sections exhibiting a substantial change in light transmissive properties in response to an electric bias signal greater than a certain threshold value applied thereto, wherein a region of the liquid crystal material exhibiting the substantial change in light transmissive properties defines a picture element for visually displaying information;

first biasing means for electrically biasing said U-shaped electrodes, said first biasing means comprising means for selectively biasing the middle one of said U-shaped electrodes and an outermost one of said U-shaped electrodes with an electrical signal effective to maintain the selected U-shaped electrode in a condition ineffective to change substantially the light transmissive properties of the liquid crystal material in the vicinity of the selected U-shaped electrode, and said first biasing means comprising means for successively and repeatedly electrically biasing successive ones of said U-shaped electrodes, except the selected U-shaped electrode, to a value sufficient to change substantially the light transmissive properties of liquid crystal material in every region where a biased U-shaped electrode crosses an electrically biased electrode section.

11. In a multiplexed liquid crystal display device according to claim 10: means for biasing selected ones of said electrode sections to visually display information.

* * * * *